United States Patent [19]

Furukawa

[11] Patent Number: 4,796,901
[45] Date of Patent: Jan. 10, 1989

[54] SADDLE-SEATED VEHICLES

[75] Inventor: Takemitsu Furukawa, Wako, Japan

[73] Assignee: Honda Giken Kogyo Kabushiki Kaisha, Tokyo, Japan

[21] Appl. No.: 21,038

[22] Filed: Mar. 2, 1987

[30] Foreign Application Priority Data

Mar. 3, 1986 [JP] Japan ............................ 61-30288[U]

[51] Int. Cl.$^4$ ............................................. B62K 11/04
[52] U.S. Cl. ...................................... 280/5 A; 180/219
[58] Field of Search ...................... 180/219; 280/5 A; 297/197

[56] References Cited

U.S. PATENT DOCUMENTS

| | | | |
|---|---|---|---|
| 4,171,731 | 10/1979 | Hilber | 180/219 |
| 4,457,524 | 7/1984 | Yoshiwara | 280/5 A |
| 4,577,719 | 3/1986 | Nomura et al. | 280/5 A |
| 4,629,201 | 12/1986 | Tsukiji | 280/5 A |
| 4,694,924 | 9/1987 | Asakura et al. | 180/229 |

Primary Examiner—David M. Mitchell
Assistant Examiner—Mitchell J. Hill
Attorney, Agent, or Firm—Armstrong, Nikaido, Marmelstein & Kubovcik

[57] ABSTRACT

The present invention provides a saddle-seated vehicle including a fuel tank and a seat located in the rear of the fuel tank, the seat having its front portion extended over the upper face of the fuel tank and provided with a resilient member biased toward the upper face of the fuel tank.

6 Claims, 3 Drawing Sheets

U.S. Patent    Jan. 10, 1989    Sheet 3 of 3    4,796,901
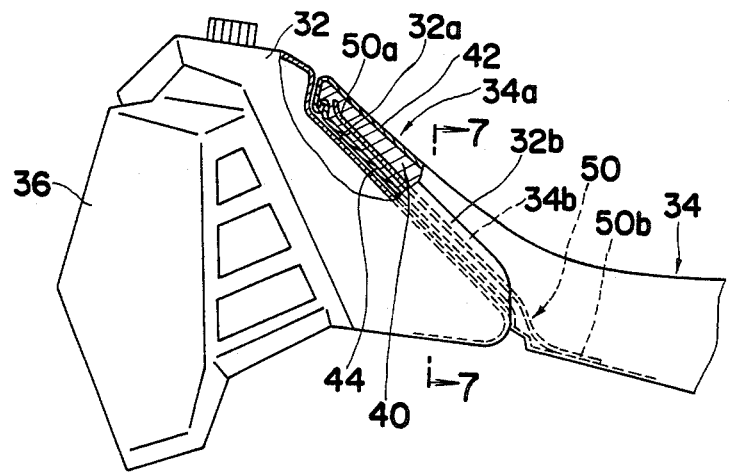
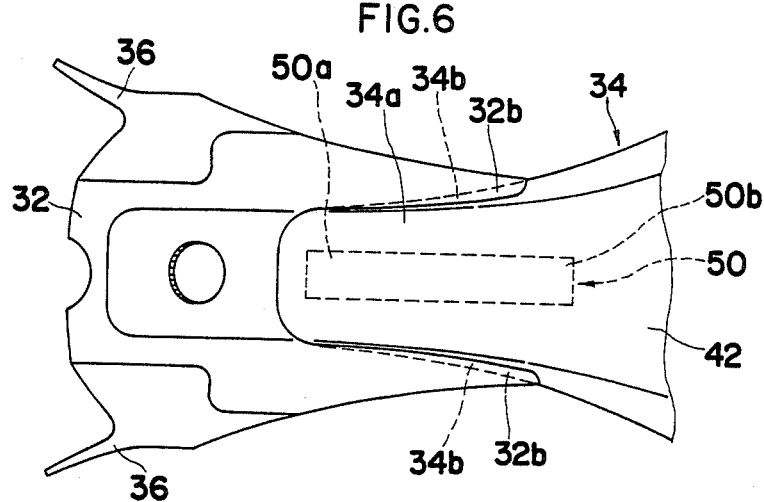
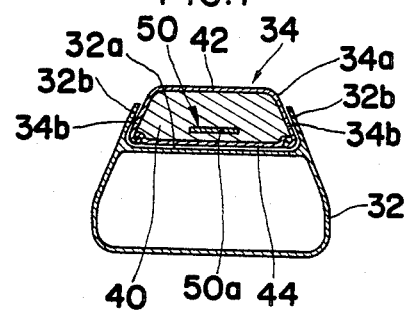

4,796,901

SADDLE-SEATED VEHICLES

FIELD OF THE INVENTION AND RELATED ART STATEMENT

The present invention relates to a saddle-seated vehicle and, more particularly, such a vehicle designed suitably for off-road type motorcycles or three- or four-wheeled buggies.

In the prior art type of such saddle-seated vehicle, the front portion of the seat is extended over the upper face of a fuel tank. This is because the rider should seat on a relatively front portion of the seat and maintain his or her position with knees gripping to cope with the inclination and vibration of the vehicle body during running on a rough road.

It is thus believed that the rider on the seat feels uncomfortable, since a load is applied on the seat to produce a reaction force and thereby lift up the front portion of the seat from the upper face of the fuel tank.

OBJECT AND SUMMARY OF THE INVENTION

A first object of the present invention is to allow the rider to feel comfortable on the seat by suppressing said lifting-up of the front portion of the seat located on the rear upper face of a fuel tank.

A second object of the present invention is to prevent dust and foul water from entering in between the front lower face of the seat and the rear upper face of the fuel tank by the suppression of said lifting-up of the front portion of the seat.

More specifically, the present invention provides a saddle-seated vehicle including a fuel tank and a seat located in the rear of said fuel tank, characterized in that said seat has its front portion extended over the rear upper face of said fuel tank, and is provided on the front portion with a resilient member having a resilient or biasing force acting toward the rear upper face of said fuel tank.

DETAILED DESCRIPTION OF PREFERRED EMBODIMENTS

Referring first to FIGS. 1 to 4 inclusive, the first embodiment of the present invention will be explained.

Figure 1:
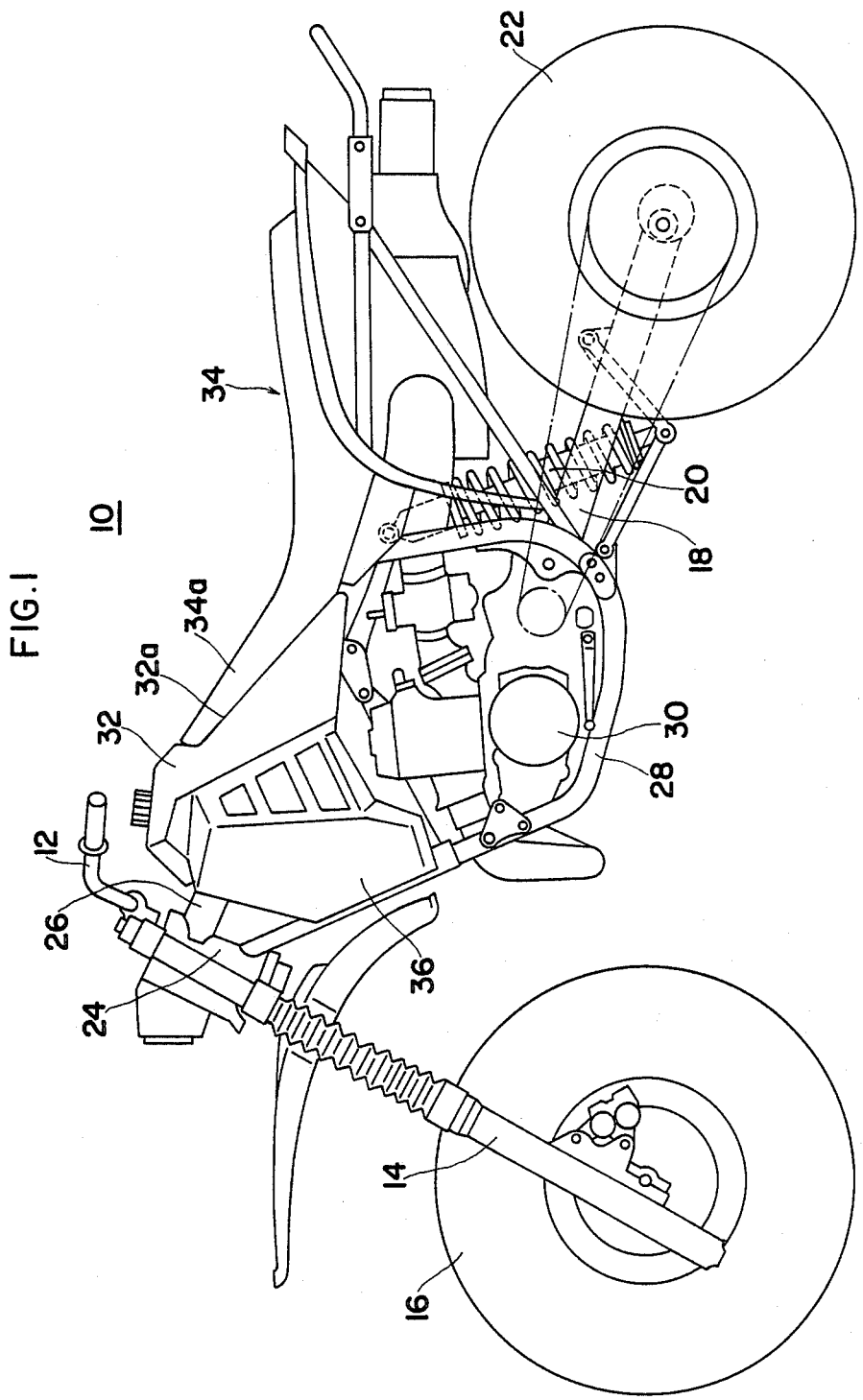
FIGS. 1 to 4 show one embodiment of the present invention, FIG. 1 being a side view illustrating one example of a three-wheeled buggy, FIG. 2 being a partly sectioned side view illustrating the fuel tank and seat, FIG. 3 being a plan view of the same and FIG. 4 being a sectional view taken along the line 4—4 of FIG. 2, and FIGS. 5 to 7 show another embodiment of the present invention, FIG. 5 being a partly sectioned side view illustrating the fuel tank and seat, FIG. 6 being a plan view of the same and FIG. 7 being a sectional view taken along the line 7—7 of FIG. 5.
Figure 2:
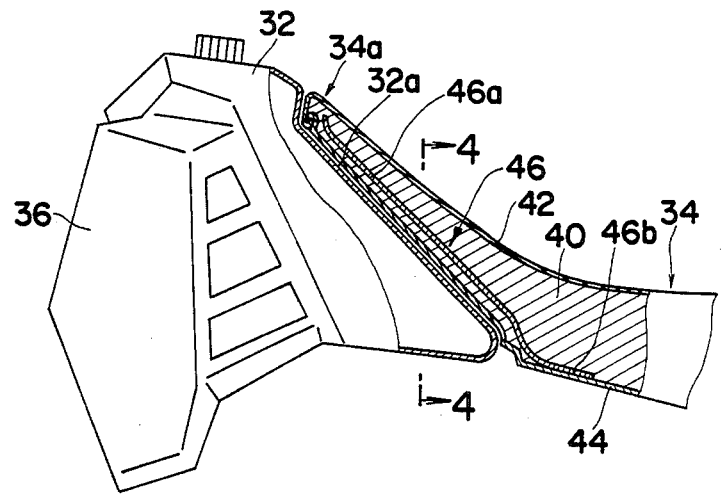
Figure 3:
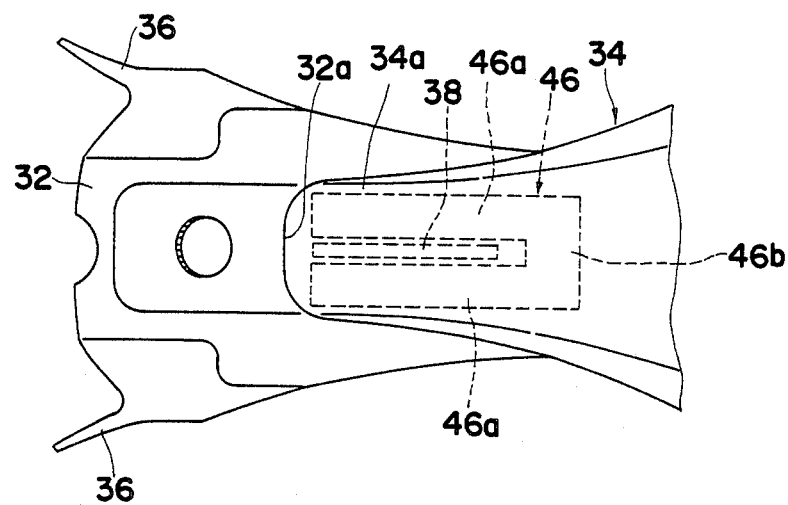
Figure 4:
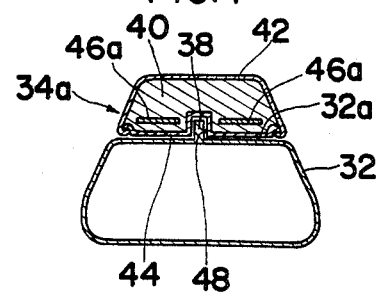

A three-wheeled buggy shown generally at 10 in FIG. 1 includes a front body portion in which a front wheel 16 is attached to the lower end of a front fork 14 operable by a handle bar 12 and a rear body portion to which a pair of rear wheels 22 are attached by means of a swing arm 18 and a rear suspension 20. A head pipe 24 for operably supporting the front fork 14 is fixedly provided with a main frame 26 and a down tube 28 which extend in the rear of the body. An engine 30 and accessories are mounted on a body frame surrounded with the main frame 26 and down tube 28. Above the main frame 26, the front portion of the body is provided with a fuel tank 32, in the rear of which a seat 34 is located. The seat 34 then has its front portion 34a extended over the rear upper face of the fuel tank 32.

On both sides of the front portion of the fuel tank 32, there are fixedly provided shrouds 36 and 36 for introducing winds to cool the engine 30 during running. The rear portion of the fuel tank 32 has its upper face inclined downwardly and recessed at 32a. The recess 32a is adapted to receive the front portion 34a of the seat 34 located in the rear of the fuel tank 32, and has its upper face (facing the fuel tank 32) substantially flattened and provided on its middle with a rib 38 extending in the longitudinal direction of the body.

The seat 34 is formed of a cushion material 40 which is covered with a skin 42 and includes a bottom plate 44 to define its bottom. Within the cushion material 40 forming the front portion 34a of the seat 34, there is a resilient member 46 producing a resilient or biasing force for biasing said front portion 34a toward the upper face of the recess 32a of the fuel tank 32. The lower bottom plate 44 of the front portion 34a of the seat 34 is provided with a groove 48 to be in engagement with the associated rib 38.

The resilient member 46 is formed of a plate-like or leaf spring member including a pair of resilient pieces 46a and 46a connected at the ends to each other by a connecting piece 46b, while the connecting piece 46b is secured to the bottom plate 44 and both resilient pieces 46a and 46a are located in the front portion 34a.

The resilient member 46 is adapted to produce a resilient or biasing force acting toward the fuel tank 32, which is larger in magnitude than the reaction force occurring on the front portion 34a of the seat 34 by the weight of the rider and a load imposed upon the seat 34 during running.

Thus, upon the seat 34 being mounted on the vehicle body, the front portion 34a thereof is fitted into the recess 32a of the fuel tank 32, whereby the rib 38 is engaged within the associated groove 48 to prevent its movement in the widthwise direction of the body, and is allowed to come into surface contact with the upper face of the fuel tank 32 located in the recess 32a by the resilient or biasing force of the resilient member 46.

Referring then to FIGS. 5 to 7 wherein like parts are indicated by like numeruals, the second embodiment of the present invention will be explained.

The fuel tank 32 is recessed at 32a in the rear thereof, and expanded portions 32b and 32b are provided on both sides of the upper face of the fuel tank 32 between which the recess 32a is positioned. The seat 34 has its front portion 34a extended over the rear upper face of the fuel tank 32 into the recess 32a, whereby sides 34b and 34b of the front portion 34a of the seat 34 are surrounded with said expanded portions 32b and 32b to prevent widthwise movement of the seat 34.

A resilient member 50 formed of a leaf spring is provided within the front portion 34a of the seat 34. As is the case with the aforesaid resilient member 46, the resilient member 50 is capable of producing a resilient or biasing force acting toward the upper face of the fuel tank 32.

It is noted that, in the aforesaid two embodiment, the widthwise movement of the seat 34 is prevented by the engagement of the rib 38 within the associated groove 48 or the expanded portions 32b and 32b with the sides 34b and 34b of the seat 34. It is understood, however, that the desired object of the present invention may be achieved without recourse to the arrangements as mentioned in the foregoing. It is also noted that the resilient member is formed of a leaf spring in the aforesaid two embodiments; however, the present invention is not limited to the use thereof, and may rely upon any suitable resilient or biasing member. As a matter of course, it is also understood that the present invention is applicable to any saddle-seated vehicles such as motorcycles or four-wheeled buggies in addition to the aforesaid three-wheeled buggies.

What is claimed is:

1. A saddle-seated vehicle including a fuel tank having a rear upper face, and a seat located in the rear of said fuel tank, wherein:

said fuel tank includes on the rear upper face a recess receiving the front portion of said seat, said seat is formed of a cushion material and has a front portion extending over the rear upper face of said fuel tank and in resilient contact with said rear upper face in said recess, and a resilient member contained in the cushion material forming said front portion and resiliently biasing said front portion of said seat into engagement with said rear upper face of said fuel tank in said recess.

2. A vehicle as claimed in claim 1, wherein said resilient member is a leaf spring.

3. A vehicle as claimed in claim 1, wherein said fuel tank includes on the rear upper face a rib extending in the longitudinal direction of the vehicle and said seat has a front lower face which includes a groove within which said rib is engaged.

4. A vehicle as claimed in claim 1, wherein said fuel tank includes on both sides of the upper face expanded portions surrounding sides of said front portion of said seat.

5. A vehicle as claimed in claim 1, wherein said seat includes a skin covering said cushion material, and a bottom plate; said resilient member being positioned in said cushion material.

6. A saddle-seated vehicle including a fuel tank having a rear upper face, and a seat located in the rear of said fuel tank, wherein:

said fuel tank includes on the rear upper face a recess receiving the front portion of said seat and on the rear upper face a rib extending in the longitudinal direction of the vehicle, said seat has a front portion extended over the rear face of said fuel tank, a front lower face which includes a groove within which said rib is engaged and a bottom plate, a resilient member in said front portion of said seat, said resilient member including a pair of resilient pieces positioned on opposite sides of said groove and a connecting piece joining ends of said pair of resilient pieces, said connecting pieces being secured to said bottom plate, said resilient member resiliently biasing said front portion into engagement with said upper face of the recess of said fuel tank.

* * * * *